US006973246B2

(12) United States Patent
Bocanegra et al.

(10) Patent No.: US 6,973,246 B2
(45) Date of Patent: Dec. 6, 2005

(54) HIGH COUNT OPTICAL FIBER CABLE

(75) Inventors: Luis M. Bocanegra, Alpharetta, GA (US); Harold P. Debban, Jr., Snellville, GA (US)

(73) Assignee: Furukawa Electric North America, Inc., Norcross, GA (US)

( * ) Notice: Subject to any disclaimer, the term of this patent is extended or adjusted under 35 U.S.C. 154(b) by 0 days.

(21) Appl. No.: 10/833,646

(22) Filed: Apr. 28, 2004

(65) Prior Publication Data

US 2005/0244115 A1    Nov. 3, 2005

(51) Int. Cl.$^7$ ............................................... G02B 6/44
(52) U.S. Cl. .................. 385/113; 385/112; 385/109; 385/110; 385/100; 385/102
(58) Field of Search ....................... 358/109, 112, 113, 358/100, 102, 103, 104, 105, 106, 107, 108, 358/110, 111

(56) References Cited

U.S. PATENT DOCUMENTS

| | | | |
|---|---|---|---|
| 4,730,894 A * | 3/1988 | Arroyo | 385/113 |
| 4,822,132 A | 4/1989 | Oestreich | |
| 4,909,593 A | 3/1990 | Harbort et al. | |
| 5,155,789 A | 10/1992 | Le Noane et al. | |
| 5,982,965 A | 11/1999 | Cheron et al. | 385/100 |
| 6,137,936 A * | 10/2000 | Fitz et al. | 385/113 |
| 6,424,770 B1 | 7/2002 | Nothofer | 385/100 |
| 6,459,837 B1 * | 10/2002 | Fitz et al. | 385/113 |
| 6,487,346 B2 * | 11/2002 | Nothofer | 385/109 |
| 6,721,480 B1 * | 4/2004 | Bocanegra et al. | 385/114 |
| 6,836,603 B1 * | 12/2004 | Bocanegra et al. | 385/113 |
| 2003/0059182 A1 * | 3/2003 | Johnson et al. | 385/112 |
| 2003/0091307 A1 * | 5/2003 | Hurley et al. | 385/109 |
| 2003/0168243 A1 | 9/2003 | Jamet et al. | 174/113 R |

FOREIGN PATENT DOCUMENTS

| | | | |
|---|---|---|---|
| EP | 0 601 434 A1 | 6/1994 | 385/100 X |
| EP | 0 833 177 A1 | 4/1998 | 385/100 X |

(Continued)

OTHER PUBLICATIONS

J. Hecht, Understanding Fiber Optics, (3d ed. 1999), pp. 152-155.

(Continued)

Primary Examiner—Brian M. Healy
(74) Attorney, Agent, or Firm—Law Office of Leo Zucker

(57) ABSTRACT

An optical fiber cable includes a number of optical fiber bundles. Each bundle contains a number of optical fiber cable units, and a relatively thin skin surrounds the cable units and retains the units in a desired configuration another over the length of the bundle. Each cable unit includes a number of optical fibers, and a first outer jacket that surrounds the fibers. The bundles are protectively enclosed by a second outer jacket of the cable. In an illustrated embodiment, each cable unit has 12 fibers, each bundle contains 12 cable units, and six bundles are protectively enclosed by the second outer jacket, so that the cable contains 432 optical fibers each of which is traceable by color and/or indicia markings.

21 Claims, 7 Drawing Sheets

FOREIGN PATENT DOCUMENTS

| | | | | |
|---|---|---|---|---|
| EP | 1 059 548 A2 | 1/2002 | ............. | 385/100 X |
| EP | 1 059 548 A3 | 1/2002 | ............. | 385/100 X |
| EP | 1 168 023 A2 | 1/2002 | ............. | 385/100 X |
| EP | 1 168 023 A3 | 1/2002 | ............. | 385/100 X |
| EP | 1 310 814 A1 | 5/2003 | ............. | 385/100 X |

OTHER PUBLICATIONS

P. Trombert et al, The Microsheath Cable: A Novel Design, Int'l Wire & Cable Symp Proc (1991) at 24-30.

P. Jamet et al, Manufacturing and Field Experimentation of Microsheath Cable, Int'l Wire & Cable Symp Proc (1994) at 196-202.

S. Pastuszka et al, A New Type of High Fiber Count, Low Dimension Optical Cable, Int'l Wire & Cable Symp Proc (1999) at 106-111.

H. Paul Debban et al, A New High-Density Central Cable Core Design, Int'l Wire & Cable Symp Proc (2000) at 1-7.

European Patent Office, Official Communication & Search Report for EP Appl'n 04020673.2 (Jul. 7, 2005), 5 pages.

* cited by examiner

HIGH COUNT OPTICAL FIBER CABLE

BACKGROUND OF THE INVENTION

1. Field of the Invention

This invention relates to telecommunication cable construction, and particularly to a cable configuration that accommodates a large number of optical fibers.

2. Discussion of the Known Art

Optical fibers for communication and information networks may be supplied individually wherein a buffer layer of soft plastics material covers the cladding of each fiber, and a hard outer layer around the buffer layer protects the fiber from the environment. Fibers may also be provided in the form of a "loose tube" cable in which fibers are contained loosely inside one or more flexible hollow tubes that are surrounded by a cable jacket, thus avoiding undue stress on the fibers while the cable is being handled during installation or servicing in the field.

Loose tube cables may also include a central dielectric member that provides rigidity to the cable, and acts as a solid core about which the individual fibers may be configured as desired. When used outdoors, loose-tube cables are usually filled with a gel that acts as a buffer and resists moisture.

A number of loose tube cables each having multiple fibers may also be held together by a single outer jacket to form a unitary cable. For example, a 216-fiber count cable may be produced by jacketing 18 loose tube cables having 12 fibers each. See, J. Hecht, Understanding Fiber Optics, Prentice Hall ($3^{rd}$ ed. 1999), at pages 152–155 (Hecht). Loose tube cables are also available with fiber counts of 4, 6 or 8 fibers inside each tube.

A so-called XpressTube® cable available from OFS is comprised of a number of loose tube cable units each of which features 12 fibers and a rip cord inside a color-coded outer jacket. A core tube surrounds all of the 12-fiber cable units, and the tube is covered by a high density polyethylene (HDPE) jacket in which diametrically opposed pairs of rip cords and strength members (metallic or dielectric) are embedded. An XpressTube cable containing 12 such cable units each having 12 fibers, will therefore contain a total of 144 fibers all of which can be readily identified and accessed. See also, U.S. Pat. No. 4,909,593 (Mar. 20, 1990); U.S. Pat. No. 5,155,789 (Oct. 13, 1992); and U.S. Pat. No. 4,822,132 (Apr. 18, 1989).

The basic concept of grouping a number of fibers together to form a fiber module with a removable jacket, and then enclosing a number of such modules in a common outer jacket, is generally known as a microsheath cable configuration. See, P. Trombert, et al., "The Microsheath Cable; A Novel Design", International Wire and Cable Symposium Proceedings (1991), at pages 24–30; P. Jamet, et al., "Manufacturing and Field Experimentation of Microsheath Cable", Int'l Wire and Cable Symp. Proc. (1994), at pages 196–202; S. Pastuszka, et al., "A New Type of High Fiber Count, Low Dimension Optical Cable With Simplified Installation Characteristics", Int'l Wire and Cable Symp. Proc. (1999), at pages 106–11; and H. P. Debban, et al, A "New High-Density Central Cable Core Design", 49th Int'l Wire and Cable Symp. Proc. (Nov. 13–16, 2000), at pages 1–7.

XpressTube or other microsheath cables having fiber counts of up to 216 have been manufactured using fiber modules of typically 12 fibers each. Thus, 18 such modules are required for a 216-fiber count cable. Since it is difficult and costly to produce modules having more than 12 fibers each, a cable with a fiber count greater than 216 must accommodate more than 18 of such modules in a unitary configuration. This constraint makes the manufacturing process quite complex. Further, the identification of and access to any one fiber inside the cable becomes difficult.

SUMMARY OF THE INVENTION

According to the invention, an optical fiber cable includes a number of optical fiber bundles. Each bundle contains a number of optical fiber cable units, and a relatively thin skin surrounds the cable units and retains the units in a first configuration over the length of the bundle. Each of the cable units includes a number of optical fibers, and an outer jacket that surrounds the fibers. The bundles are protectively enclosed and retained in a second configuration by an outer jacket of the cable.

In an illustrative embodiment, six fiber bundles are arrayed inside the cable, and the surrounding skins of the bundles are coded for identification. Each fiber bundle includes six cable units the jackets of which are also coded, and each cable unit in turn contains 12 individually coded optical fibers. Thus, a total of 432 fibers are enclosed in the cable in such a manner that any one of the fibers can be easily accessed as desired.

For a better understanding of the invention, reference is made to the following description taken in conjunction with the accompanying drawing and the appended claims.

DETAILED DESCRIPTION OF THE INVENTION

Figure 1:
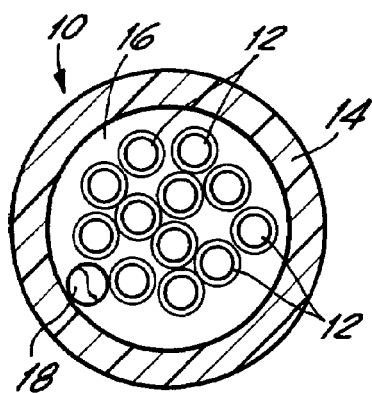
FIG. 1 is a cross-sectional view of a fiber optic cable unit or module.

FIG. 1 shows a cross-section of a modular fiber optic cable unit 10 as taken transversely of the axis of the unit. The unit 10 includes a number of individual optical fibers 12, each of which has an outer protective layer that is coded for purposes of identification, for example, by way of color and/or marking indicia. The fibers 12 are surrounded by a common jacket 14 made of, e.g., a polyolefin such as linear low-density polyethylene (LLDPE). The jacket 14 is relatively thin, for example, not more than about 0.008 inches (0.2 mm). In the illustrated embodiment, the cable unit 10 has 12 optical fibers, and the nominal outside diameter of the jacket 14 is preferably not more than about 0.059 inch (1.5 mm). A filling compound or gel 16 occupies any open gaps inside the jacket 14, and a rip cord 18 extends next to the inner periphery of the jacket and beyond opposite ends of the cable unit. Thus, the jacket 14 is opened by pulling a free end of the cord 18, and exposed ends of the individual fibers 12 are identified by color and/or marking.

Figure 2:
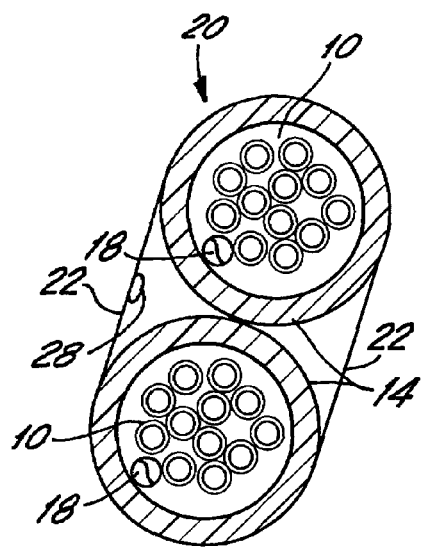
FIG. 2 is a cross-section of a 24-fiber bundle.

FIG. 2 is a cross-sectional view of a 24-fiber bundle 20 wherein the bundle 20 includes two of the cable units 10 in FIG. 1. The bundle 20 has a thin skin 22 of LLDPE, polypropylene, or equivalent material which binds the two cable units close to one another over the length of the bundle, and affords some additional protection for the individual units. The skin thickness is preferably not more than about 0.008 inch (0.2 mm).

Inside the bundle 20, between the skin 22 and the jackets 14 of the cable units 10, materials such as aramid, glass yarns, super absorbent powder, and/or water swellable tape may be provided to fill gaps and to reduce or eliminate moisture. In addition to the rip cord 18 inside each cable unit, a bundle rip cord 28 extends near the inner periphery of the skin 22 over the length of the bundle 20, so that the skin can be opened at opposite ends of the bundle to access the individual cable units.

Figure 3:
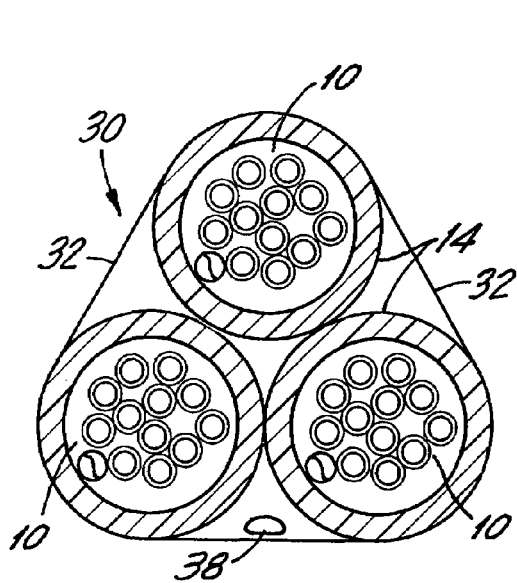
FIG. 3 is a cross-section of a 36-fiber bundle.

FIG. 3 is a cross-sectional view of a 36-fiber bundle 30 according to the invention, wherein the bundle 30 is comprised of three of the cable units 10 in FIG. 1. A thin bundle skin 32 of LLDPE, polypropylene, or equivalent material binds the individual cable units to one another over the length of the bundle, and provides some additional protection for the units. A bundle rip cord 38 near the inside surface of the skin 32 extends over the length of the bundle 30, and a water absorbent material such as aramid, glass yarns, super absorbent powder and/or water swellable tape may be provided to fill any gaps between the jackets 14 of the cable units 10 and the bundle skin 32.

Figure 4:
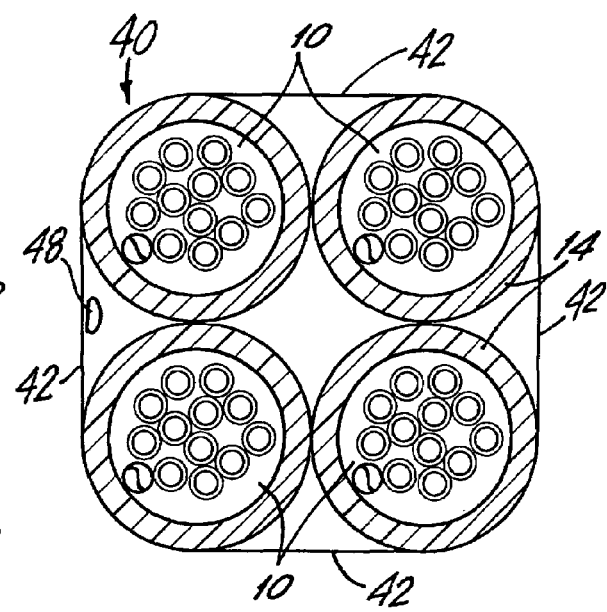
FIG. 4 is a cross-section of a 48-fiber bundle.

FIG. 4 is a cross-sectional view of a 48-fiber bundle 40 according to the invention. Four of the cable units 10 in FIG. 1 are closely bound by a thin skin 42 of LLDPE, polypropylene, or equivalent material over the length of the bundle. A bundle rip cord 48 extends over the length of the bundle next to the inner surface of the bundle skin 42, and one or more moisture absorbing materials may fill any gaps between the jackets 14 of the cable units 10 and the bundle skin 42.

If desired, the cable units 10 in the bundles 30, 40 may be disposed about a central organizer or filler element (not shown in FIGS. 3 and 4) that extends along the axis of either bundle. Also, the individual cable units 10 may be stranded about the filler element by continuous lay, by reverse oscillating lay (ROL) in which the direction of stranding (CW or CCW) about the filler element is reversed after a certain number of stranding twists, or the units 10 may be arranged without any stranding.

Figure 5:
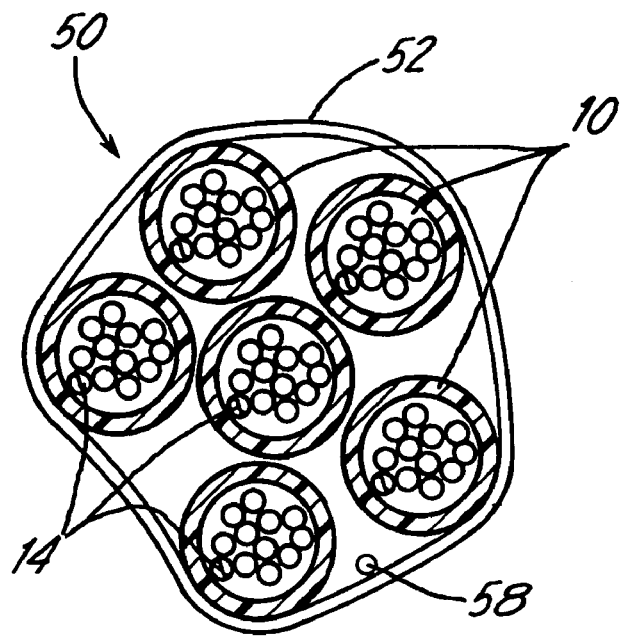
FIG. 5 is a cross-section of a 72-fiber bundle.

FIG. 5 is a cross-sectional view of a 72-fiber bundle 50 according to the invention. Six of the cable units 10 in FIG. 1 are surrounded by a thin skin 52 that binds the units 10 with one another over the length of the bundle 50. Like the bundle skins 32, 42, the skin 52 is preferably made of LLDPE, polypropylene, or equivalent material that is not more than about 0.008 inch (0.2 mm) thick. A bundle rip cord 58 near the inner surface of the bundle skin 52 runs over the length of the bundle 50, and allows access to the individual cable units 10 upon pulling a free end of the cord and tearing the skin open at either end of the bundle 50. Also, water absorbing materials such as aramid, glass yarns, and/or water swellable tape may be packed between the cable unit jackets 14 and the inside surface of the bundle skin 52.

Figure 6:
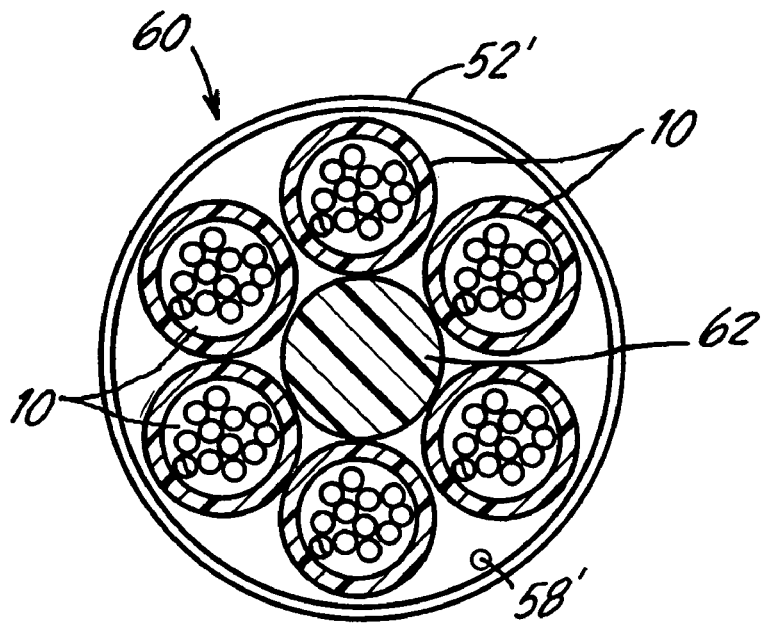
FIG. 6 is a cross-section of an alternate embodiment of a 72-fiber bundle.

FIG. 6 is a cross-sectional view of an alternate embodiment of a 72-fiber bundle 60 according to the invention. Components the same or similar to those in the embodiment of FIG. 5 have the same reference numerals. The bundle 60 differs from the bundle 50 of FIG. 5 by the addition of a central organizer or filler element 62. The filler element 62 may be in the form of a plastics (e.g., HDPE) rod, a glass rod, or a glass rod coated (upjacketed) with a plastics material including, e.g., HDPE. As mentioned, rather than to impart tensile strength to the bundle 60, the purpose of the filler element 62 is to keep the individual cable units 10 in a desired orientation with respect to one another over the length of the bundle 60 such as that shown in FIG. 6. The 72-fiber bundles 50, 60 in FIGS. 5 and 6 have outer diameters that preferably are not more than about 0.193 inch (4.9 mm).

Figure 7:
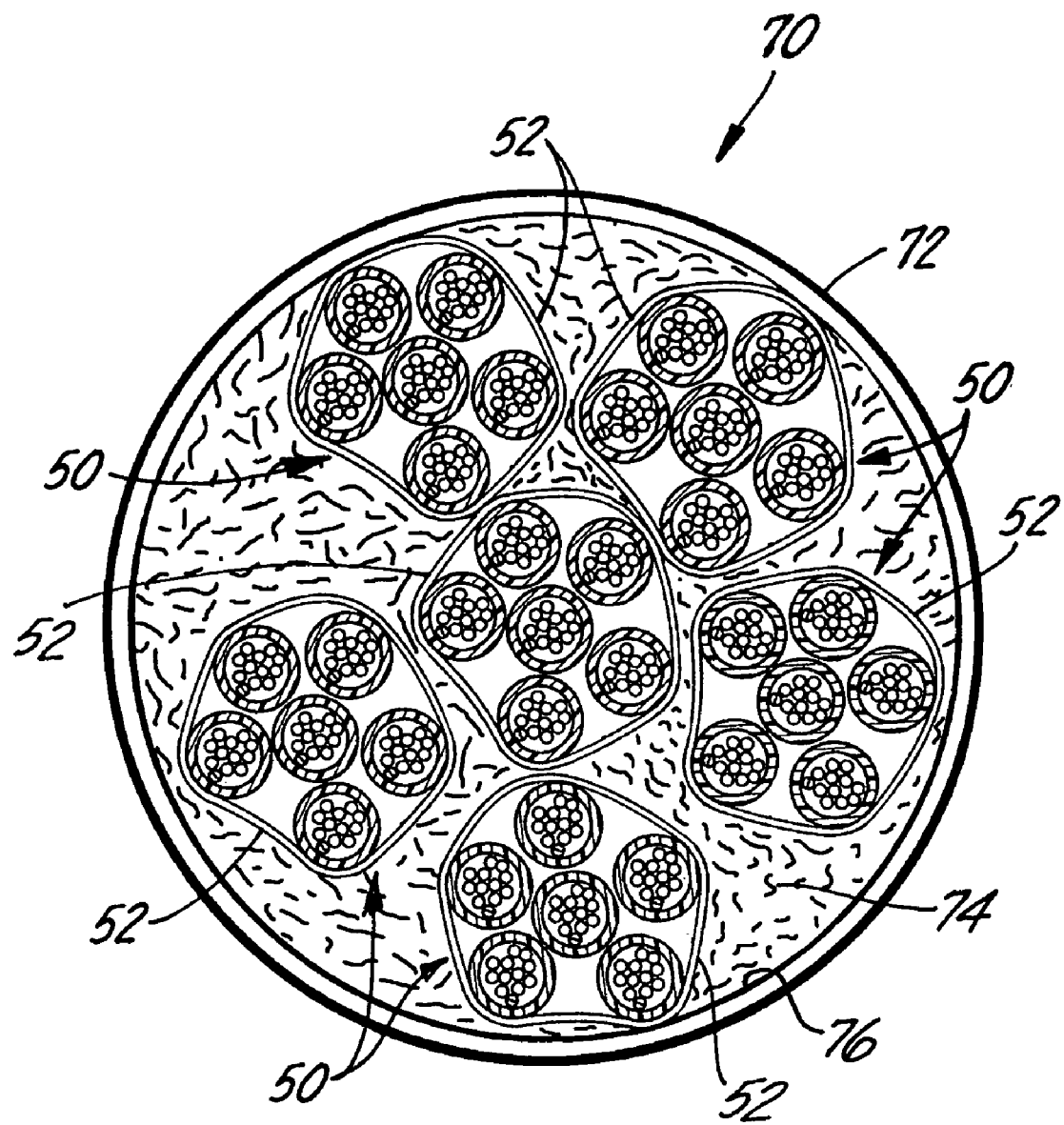
FIG. 7 is a cross-section of a first embodiment of a 432-fiber cable core.

FIG. 7 is a cross-sectional view of a first embodiment of a 432-optical fiber cable core 70, according to the invention. The cable core 70 includes six of the 72-fiber bundles 50 shown in FIG. 5. The thin skins 52 of each bundle may be coded by color and/or marking indicia to permit location of and access to a desired one of the cable units 10 contained in the bundle. All of the fiber bundles 50 are contained within a core tube 72 having an outer diameter of, e.g., about 0.74 inch (18.76 mm) and an inner diameter of, e.g., about 0.60 inch (15.24 mm). The core tube 72 is preferably made of plastics such as, e.g., polyethylene with a wall thickness of about 0.035 inch (0.89 mm). The cable core 70 in FIG. 7 lacks any filler element, and is packed with water swellable yarns 74 and has a layer of water swellable tape 76 on the inner circumference of the core tube 72. Water ingress along each of the bundles 50 may also be prevented by introducing a super absorbent powder over the bundle skins 52.

Figure 8:
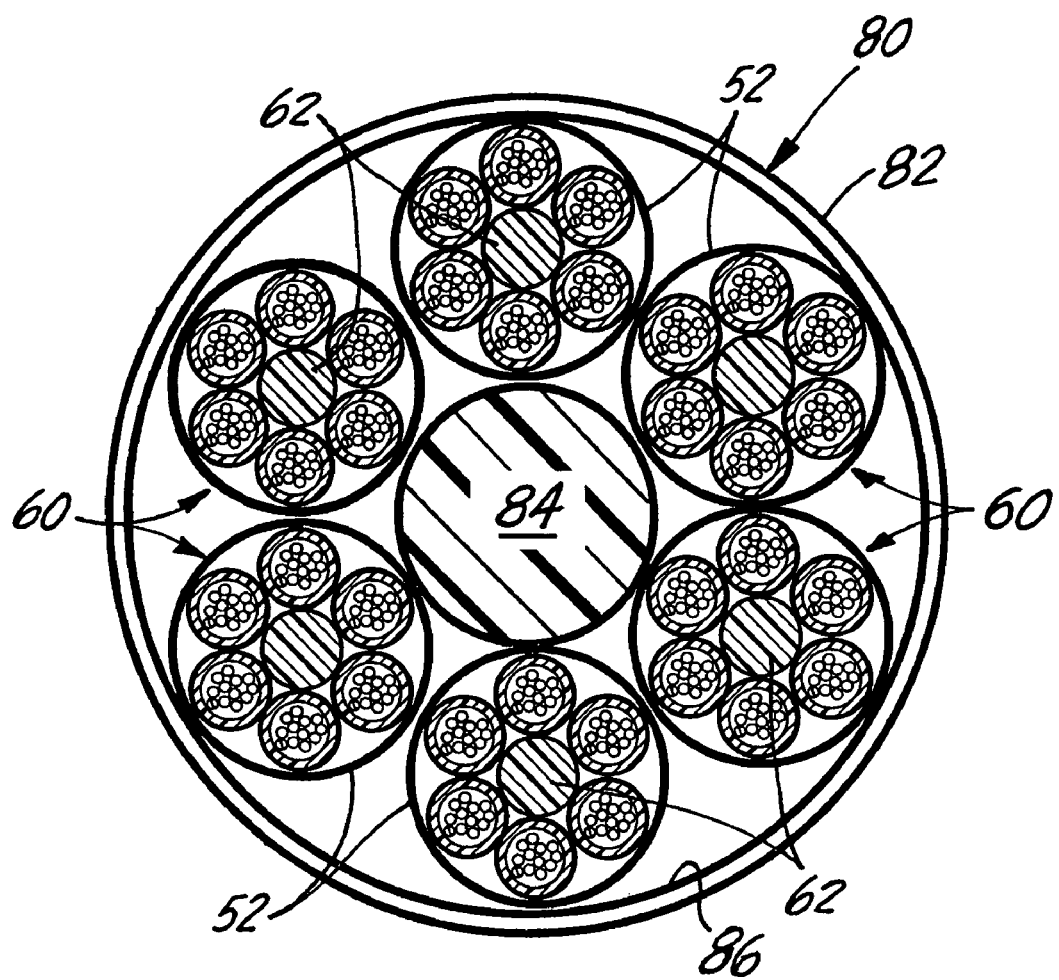
FIG. 8 is a cross-section of a second embodiment of a 432-fiber cable core.

FIG. 8 is a cross-sectional view of a second embodiment of a 432-optical fiber cable core 80 according to the invention. The cable core 80 is comprised of a core tube 82 which may be the same or similar to the core tube 72 in FIG. 7. Unlike the FIG. 7 embodiment, however, the cable core 80 maintains an even or symmetrical configuration of the six 72-fiber bundles 60 in FIG. 6 with the aid of a filler element 84. The element 84 extends along the length of the cable core substantially coincident with the core axis. The skins 52 of the fiber bundles 60 are also preferably coded by color and/or marking indicia to facilitate identification of a given fiber among the 36 cable units inside the core. Voids between the individual bundles 60 and the core tube 82 may be packed with yarns (not shown), and a layer of water blocking tape 86 may be provided on the inner circumference of the core tube 82 to reduce or eliminate moisture. The core tube 82 may be formed using the same material and dimensions as the tube 72 in the embodiment of FIG. 7.

Figure 9:
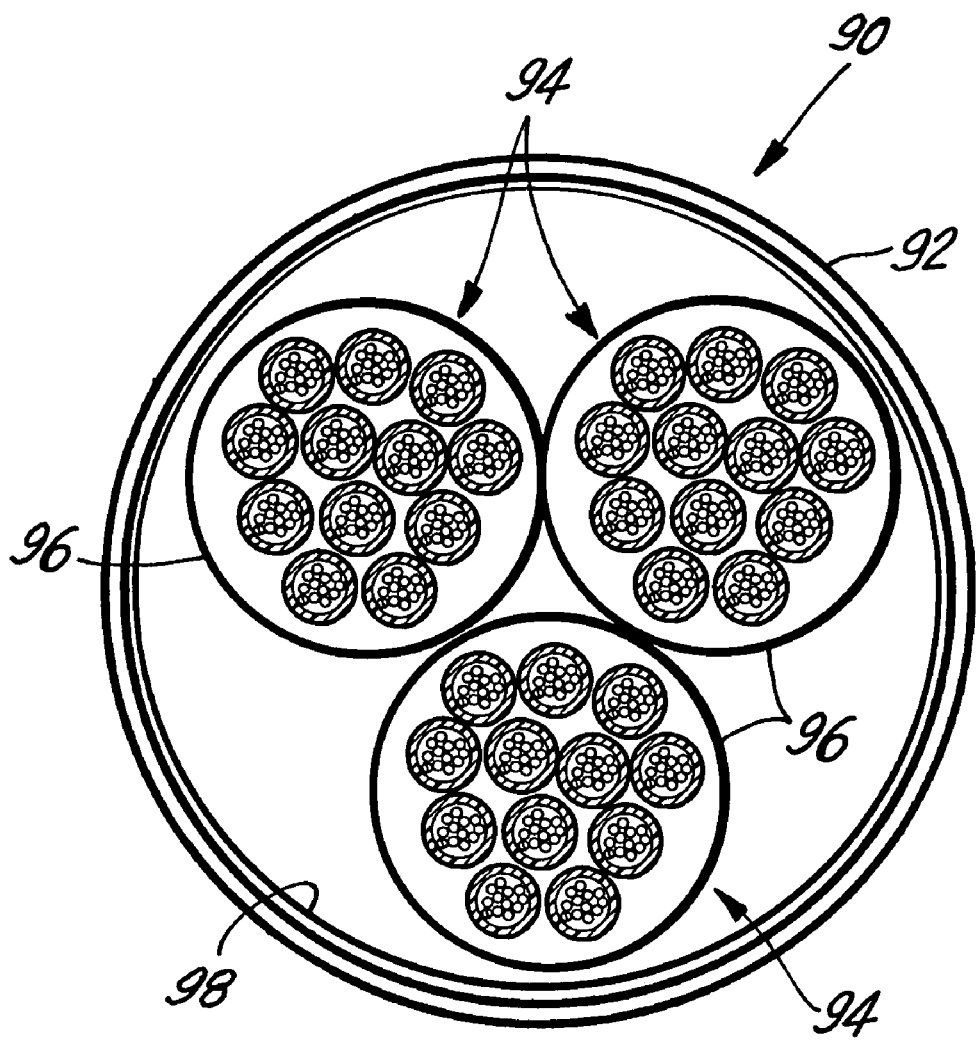
FIG. 9 is a cross-section of a third embodiment of a 432-fiber cable core.

FIG. 9 is a cross-sectional view of a third embodiment of a 432-fiber cable core 90 according to the invention. The configuration shown in FIG. 9 is a so-called central core cable construction, and includes a core tube 92 and three fiber bundles 94 each of which contains twelve of the cable units in FIG. 1. Each bundle 94 may have a different colored thin skin 96 of polypropylene with a thickness of about 0.008 inch. The outer diameter of the core tube 92 is about 0.72 inch (18.3 mm) and the outer diameter of each of the fiber bundles 94 is about 0.26 inch (6.6 mm). Each of the fiber bundles 94 thus contains 144 optical fibers any given one of which can be identified and accessed by appropriate coding and the use of multiple rip cords. As in the embodiments described above, voids between the individual bundle skins 96 and the inside surface of the core tube may be packed with yarns (not shown), and a layer of water blocking tape 98 may be placed on the inside surface of the tube 92 to reduce or eliminate ingress of moisture.

Figure 10:
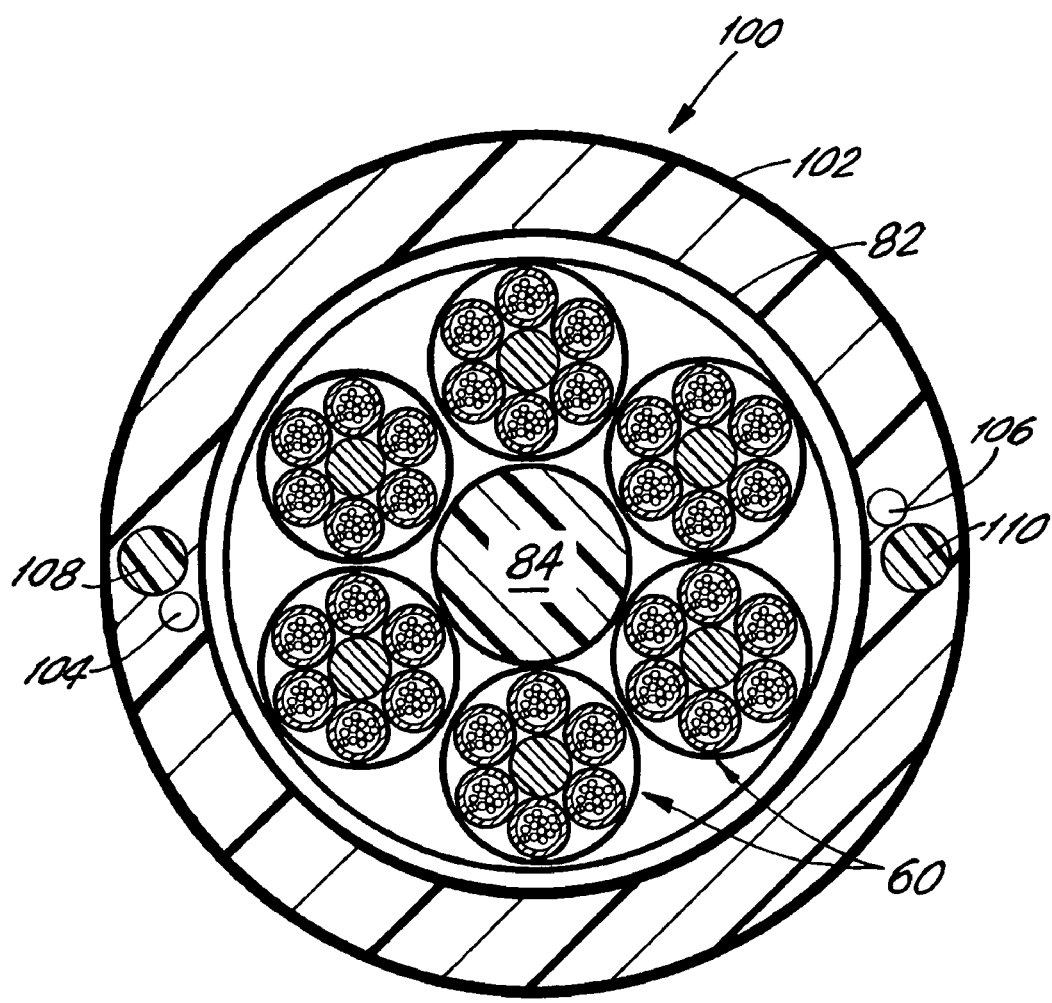
FIG. 10 is a cross-section of a 432-fiber cable including the cable core of FIG. 8.

FIG. 10 is a cross sectional view of a finished 432-fiber cable 100 according to the invention, as taken transversely of the cable axis. The cable 100 is suitable for various applications outdoors and/or underground. A protective outer jacket 102 of polyethylene or equivalent material covers the outer periphery of the core tube 82. Also, a pair of rip cords 104, 106 are embedded in the wall of the outer jacket 102 at substantially diametrically opposed locations near the inner surface of the jacket wall. Further, a pair of dielectric strengthening members 108, 110 are embedded at diametrically opposed positions along the length of the jacket wall to impart a desired degree of tensile strength and rigidity to the cable 100. The outer diameter of the cable 100 is, e.g., about 1.05 inches (26.8 mm).

It is also contemplated that one or more of the individual fiber bundles 20, 30, 40, 50 or 60 may be blown or otherwise installed in a known manner to run in existing ducts or subducts that will serve physically to protect the bundles, thus obviating the need for a core tube and/or an outer jacket about the bundles. That is, the bundles may be used individually in applications where they do not form part of a higher count optical fiber cable.

Figure 11:
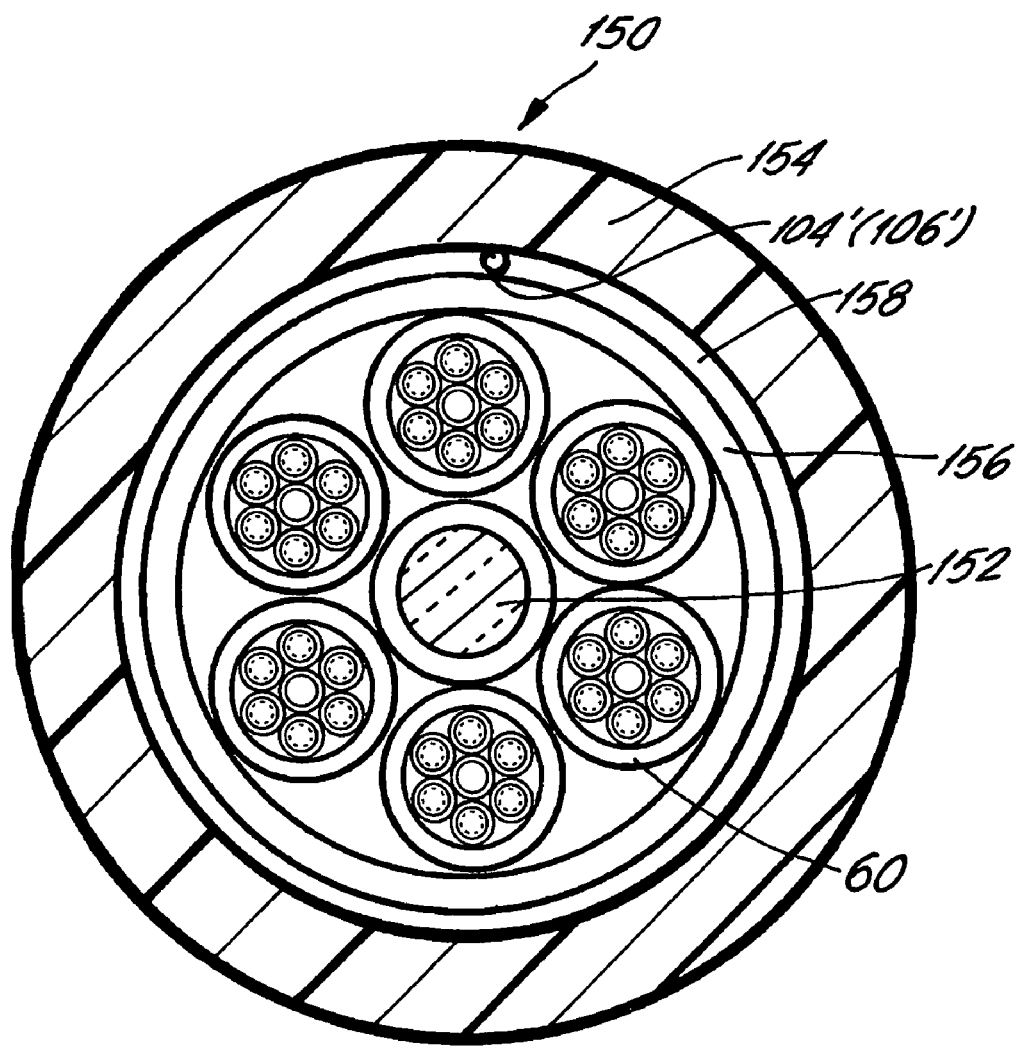
FIG. 11 is a cross-section of a 432-fiber cable having an overall loose tube construction.

FIG. 11 is a cross-section of a 432-fiber cable 150 having an overall "loose tube" construction, in contrast to the "central core" construction of cable 100 in FIG. 10. The difference between the two constructions lies in the location of those members that provide the tensile strength and rigidity necessary for the cable to carry anticipated loads when installed. In the loose tube cable 150, a central member 152 serves a dual purpose, namely, to carry the load (i.e., to act a strength member) and to serve as an organizer about which, for example, six of the 72-fiber bundles 60 are disposed. Note that in the cable 150 there are no strength members embedded in a cable jacket 154, such as the members 110 in the jacket 102 of the cable 100 in FIG. 10. The central member 152 may be formed of, e.g., glass reinforced polyester (GRP) and is basically a glass rod of about 0.14 inch (3.5 mm) diameter that is sheathed (upjacketed) with a PE layer to an outer diameter of about 0.22 inch (5.5 mm). The glass rod is flexible and is typically comprised of fibers.

The use of glass for the central member 152 also prevents the cable from acting undesirably as an electrical conductor. The use of metallic components in either of the cables 100, 150 is therefore preferably avoided.

After cable installation, there is always a possibility of water ingress into the cable should closure boxes or manholes in which the cables are supported become flooded. Closure boxes in particular are used in aerial cable installations between poles, and fibers of one cable entering the box on one side typically exit from the opposite side of the box within two or more cables. If not tightly sealed, water can enter the box and propagate inside the associated cables.

To prevent water from migrating along cable elements such as the central member 152 in FIG. 11, a water blocking material such as (i) super absorbent powder, (ii) yarns or threads with super absorbent powder, or (iii) tape with water blocking powder or simply water blocking tape, may be used. These materials will swell and increase their volume several times in the presence of water, or gel, to form a colloidal substance that will effectively stop the propagation of water.

Specifically, in the loose tube cable 150 of FIG. 11, a water swellable tape 156 surrounds the six fiber bundles 60 tightly with a build up of about 0.02 inch (0.5 mm). Aramid yarns 158 are then built up over the tape 154 also by about 0.02 inch (0.5 mm). The tape 156 may not alone be sufficient to prevent water from traveling along the central member 152, however, because of the time needed for the water blocking agent in the tape to disperse and diffuse toward the center of the cable 150. That is, the "swell" must occur quickly to block the water. Accordingly, swellable threads or yarns (not shown) are preferably disposed directly about the periphery of the central member 152.

While the foregoing represents preferred embodiments of the invention, it will be understood by those skilled in the art that various modifications and changes may be made without departing from the spirit and scope of the invention, and that the invention includes all such modifications and changes as come within the scope of the following appended claims.

We claim:

1. An optical fiber cable having a central core construction wherein strength members that provide tensile strength and rigidity necessary for the cable to carry anticipated loads are embedded in an outer jacket of the cable, comprising:
   a number of optical fiber bundles;
   each one of the fiber bundles includes a number of optical fiber cable units, and a skin surrounding the cable units in such manner as to retain the units in a desired configuration over a length of the bundle wherein the skin has a thickness of not more than about 0.008 inch (0.2 mm);
   each one of the cable units includes a number of optical fibers, and a first outer jacket that protectively surrounds the fibers of the unit wherein the first outer jacket has a thickness of not more than about 0.008 inch (0.2 mm);
   a second outer jacket dimensioned and arranged for protectively enclosing the optical fiber bundles; and
   one or more strength members embedded in a wall of the second outer jacket along the length of the cable for providing the cable with the necessary tensile strength and rigidity.

2. A cable according to claim 1, wherein one or more of the optical fiber bundles each has a central filler element for keeping the cable units of the bundle in the desired configuration over the length of the bundle.

3. A cable according to claim 1, wherein each one of the optical fiber bundles has an associated first rip cord extending near the inner periphery of the skin of the bundle, for opening the skin and for providing access to the cable units of the bundle.

4. A cable according to claim 3, wherein each one of the optical fiber cable units has an associated second rip cord extending near the inner periphery of the first outer jacket for opening the jacket to expose the optical fibers of the cable unit.

5. A cable according to claim 1, including one or more third rip cords associated with the second outer jacket for opening the jacket to expose the optical fiber bundles inside the cable.

6. A cable according to claim 1, including an organizer element extending centrally along the length of the cable, and the fiber bundles are configured symmetrically about the organizer element.

7. A cable according to claim 1, wherein the skins of the optical fiber bundles are coded for identification.

8. A cable according to claim 1, wherein the optical fibers of the cable units are individually coded for identification.

9. A cable according to claim 1, wherein the first outer jackets of the cable units are coded for identification.

10. A cable according to claim 1, including at least 432 of said optical fibers.

11. An optical fiber cable having a central core construction wherein strength members that provide tensile strength and rigidity necessary for the cable to carry anticipated loads are embedded in an outer jacket of the cable, comprising:
- a number of optical fiber bundles;
- each one of the fiber bundles includes a number of optical fiber cable units, and a skin surrounding the cable units in such manner as to retain the units in a desired configuration over a length of the bundle wherein the skin has a thickness of not more than about 0.008 inch (0.2 mm);
- each one of the cable units includes a number of optical fibers, and a first outer jacket that protectively surrounds the fibers of the unit wherein the first outer jacket has a thickness of not more than about 0.008 inch (0.2 mm);
- a core tube for containing the optical fiber bundles in a desired configuration over a length of the cable;
- a second outer jacket dimensioned and arranged for protectively enclosing the core tube containing the optical fiber bundles; and
- one or more strength members embedded in a wall of the second outer jacket along the length of the cable for providing the cable with the necessary tensile strength and rigidity.

12. An optical fiber cable according to claim 11, wherein the strength members embedded in the wall of the second outer jacket of the cable comprise a dielectric material.

13. A cable according to claim 11, wherein one or more of the optical fiber bundles each has a central filler element for keeping the cable units of the bundle in the desired configuration over the length of the bundle.

14. A cable according to claim 11, wherein each one of the optical fiber bundles has an associated first rip cord extending near the inner periphery of the skin of the bundle, for opening the skin and for providing access to the cable units of the bundle.

15. A cable according to claim 14, wherein each one of the optical fiber cable units has an associated second rip cord extending near the inner periphery of the first outer jacket for opening the jacket to expose the optical fibers of the cable unit.

16. A cable according to claim 11, including one or more third rip cords associated with the second outer jacket for opening the jacket to expose the optical fiber bundles inside the cable.

17. A cable according to claim 11, including an organizer element extending centrally along the length of the cable, and the fiber bundles are configured symmetrically about the organizer element.

18. A cable according to claim 11, wherein the skins of the optical fiber bundles are coded for identification.

19. A cable according to claim 11, wherein the optical fibers of the cable units are individually coded for identification.

20. A cable according to claim 11, wherein the first outer jackets of the cable units are coded for identification.

21. A cable according to claim 11, including at least 432 of said optical fibers.

\* \* \* \* \*